US012078093B2

(12) United States Patent
Ji et al.

(10) Patent No.: US 12,078,093 B2
(45) Date of Patent: Sep. 3, 2024

(54) TURBINE FRACTURING EQUIPMENT

(71) Applicant: YANTAI JEREH PETROLEUM EQUIPMENT & TECHNOLOGIES CO., LTD., Shandong (CN)

(72) Inventors: Xiaolei Ji, Shandong (CN); Rikui Zhang, Shandong (CN); Ruijie Du, Shandong (CN); Peng Zhang, Shandong (CN); Sheng Chang, Shandong (CN); Chunqiang Lan, Shandong (CN); Yipeng Wu, Shandong (CN); Xincheng Li, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/722,150

(22) Filed: Apr. 15, 2022

(65) Prior Publication Data

US 2022/0341358 A1 Oct. 27, 2022

(30) Foreign Application Priority Data

Apr. 25, 2021 (CN) ......................... 202120859294.9

(51) Int. Cl.
*F01N 5/02* (2006.01)
*E21B 43/26* (2006.01)
(Continued)

(52) U.S. Cl.
CPC ............ *F01N 5/04* (2013.01); *E21B 43/2607* (2020.05); *F01D 15/08* (2013.01); *F01D 15/10* (2013.01);
(Continued)

(58) Field of Classification Search
CPC .......... F02C 3/10; F02C 6/18; F05D 2260/60; F05D 2260/62; F05D 2260/64;
(Continued)

(56) References Cited

U.S. PATENT DOCUMENTS 6,089,020 A 7/2000 Kawamura
6,449,954 B2 * 9/2002 Bachmann ........... B01D 5/0039 60/39.182

(Continued)

FOREIGN PATENT DOCUMENTS

CA 2 703 550 A1 6/2011
CN 2481853 Y 3/2002

(Continued)

*Primary Examiner* — Todd E Manahan
*Assistant Examiner* — Sean V Meiller
(74) *Attorney, Agent, or Firm* — Crowell & Moring LLP

(57) ABSTRACT

Turbine fracturing equipment is provided. The turbine fracturing equipment includes: a turbine engine, having an exhaust end configured to discharge exhaust gas; an exhaust pipe having a first end and a second end, the first end of the exhaust pipe being configured such that the exhaust gas discharged from the exhaust end of the turbine engine enters the exhaust pipe, and the second end of the exhaust pipe being configured to discharge the exhaust gas in the exhaust pipe; and an exhaust gas energy recovery device, the exhaust gas energy recovery device including a thermal energy recovery mechanism configured to recover thermal energy of the exhaust gas and a kinetic energy recovery mechanism configured to recover kinetic energy of the exhaust gas, at least a part of the thermal energy recovery mechanism and at least a part of the kinetic energy recovery mechanism are arranged in the exhaust pipe.

17 Claims, 5 Drawing Sheets

(51) Int. Cl.

| | |
|---|---|
| ***F01D 15/08*** | (2006.01) |
| ***F01D 15/10*** | (2006.01) |
| ***F01D 25/30*** | (2006.01) |
| ***F01N 5/04*** | (2006.01) |

(52) U.S. Cl.
CPC .......... *F01N 5/025* (2013.01); *F05D 2220/60* (2013.01); *F05D 2220/76* (2013.01)

(58) Field of Classification Search
CPC .......... F05D 2260/76; F01N 5/00; F01N 5/02; F01N 5/025; F01D 25/30; E21B 43/2607
See application file for complete search history.

(56) References Cited

U.S. PATENT DOCUMENTS

| | | | | |
|---|---|---|---|---|
| 8,171,732 | B2 * | 5/2012 | Evulet | F03D 80/00 60/614 |
| 9,850,794 | B2 * | 12/2017 | Kulkarni | F01N 3/05 |
| 10,830,029 | B2 * | 11/2020 | Bishop | F04B 17/05 |
| 2004/0045594 | A1 * | 3/2004 | Hightower | F02C 6/18 52/173.1 |
| 2014/0096518 | A1 * | 4/2014 | Gallimore | F01N 5/00 60/614 |
| 2016/0076447 | A1 * | 3/2016 | Merlo | F02C 7/04 60/39.12 |
| 2019/0204021 | A1 | 7/2019 | Morris et al. | |

FOREIGN PATENT DOCUMENTS

| | | | | | |
|---|---|---|---|---|---|
| CN | 204098964 | U | | 1/2015 | |
| CN | 206561310 | U | | 10/2017 | |
| CN | 206625884 | U | | 11/2017 | |
| CN | 108751105 | A | | 11/2018 | |
| CN | 110043353 | A | | 7/2019 | |
| CN | 110469314 | A | | 11/2019 | |
| CN | 210801137 | U | | 6/2020 | |
| CN | 111674423 | A | | 9/2020 | |
| CN | 211640534 | U | | 10/2020 | |
| CN | 112428782 | A | | 3/2021 | |
| GB | 2501458 | A | * | 10/2013 | F01K 23/065 |
| WO | WO-2014005921 | A1 | * | 1/2014 | F01D 25/32 |

* cited by examiner

TURBINE FRACTURING EQUIPMENT

CROSS-REFERENCES TO RELATED APPLICATIONS

This patent application is based on and claims priority to China Patent Application No. 202120859294.9 filed on Apr. 25, 2021, the disclosure of which is incorporated herein by reference in its entirety as part of the present application.

TECHNICAL FIELD

At least one embodiment of the present disclosure relates to turbine fracturing equipment.

BACKGROUND

With the maturity of turbine engine technology, turbine-based fracturing equipment is widely used in oil field well site.

SUMMARY

The embodiments of the present disclosure relate to turbine fracturing equipment, which realizes the energy recovery of the exhaust gas discharged by the turbine engine of the turbine fracturing equipment by providing a thermal energy recovery mechanism and a kinetic energy recovery mechanism in an exhaust pipe.

At least one embodiment of the present disclosure provides turbine fracturing equipment, including: a turbine engine, having an exhaust end configured to discharge exhaust gas; an exhaust pipe, the exhaust pipe having a first end and a second end, the first end of the exhaust pipe being configured such that the exhaust gas discharged from the exhaust end of the turbine engine enters the exhaust pipe, and the second end of the exhaust pipe being configured to discharge the exhaust gas in the exhaust pipe; an exhaust gas energy recovery device, the exhaust gas energy recovery device including a thermal energy recovery mechanism and a kinetic energy recovery mechanism, the thermal energy recovery mechanism being configured to recover thermal energy of the exhaust gas, and the kinetic energy recovery mechanism being configured to recover kinetic energy of the exhaust gas; at least a part of the thermal energy recovery mechanism and at least a part of the kinetic energy recovery mechanism are arranged in the exhaust pipe.

According to the embodiment of the present disclosure, the turbine fracturing equipment further includes a reduction gearbox, a transmission device, and a plunger pump; the turbine engine has an output end, the reduction gearbox has an input end and an output end, the output end of turbine engine is connected with the input end of reduction gearbox, and the output end of the reduction gearbox is connected with the plunger pump through the transmission device.

According to the embodiment of the present disclosure, the turbine fracturing equipment further includes a movable component, the movable component has a first surface, and the turbine engine, the exhaust pipe, the reduction gearbox, the transmission device, and the plunger pump are arranged on the first surface.

According to the embodiment of the present disclosure, the movable component includes a skid or a transport vehicle.

According to the embodiment of the present disclosure, the thermal energy recovery mechanism is arranged at a side of the kinetic energy recovery mechanism away from the exhaust end.

According to the embodiment of the present disclosure, the kinetic energy recovery mechanism is arranged at a side of the thermal energy recovery mechanism away from the exhaust end.

According to the embodiment of the present disclosure, the thermal energy recovery mechanism includes a heat exchanger arranged in the exhaust pipe, a working medium is provided within the heat exchanger, the heat exchanger has a working medium inlet and a working medium outlet, the heat exchanger is configured to allow the exhaust gas from the exhaust end flows therethrough, and the working medium inlet and the working medium outlet are communicated with a heat storage device, respectively.

According to the embodiment of the present disclosure, the thermal energy recovery mechanism includes a thermoelectric generator, the thermoelectric generator has a high temperature side and a low temperature side, and the thermoelectric generator is configured to provide a voltage in a case where a temperature difference is formed between the high temperature side and the low temperature side.

According to the embodiment of the present disclosure, the high temperature side of the thermoelectric generator is configured to allow the exhaust gas from the exhaust end to pass therethrough, the high temperature side is arranged in the exhaust pipe and the low temperature side is arranged outside the exhaust pipe.

According to the embodiment of the present disclosure, the kinetic energy recovery mechanism includes a wind power generation device, the wind power generation device includes a blade, a rotating shaft, and a wind power generator, the blade is connected with the rotating shaft, the rotating shaft is connected with the wind power generator, the wind power generator is provided with an electric energy output end, and the electric energy output end is configured to be connected with an electric energy storage device.

According to the embodiment of the present disclosure, the kinetic energy recovery mechanism comprises a wind power generation device, the wind power generation device comprises a blade, a rotating shaft, and a wind power generator, the blade is connected with the rotating shaft, and the rotating shaft is connected with the wind power generator.

According to the embodiment of the present disclosure, the wind power generator is provided with an electric energy output end, and the electric energy output end of the wind power generator is configured to be connected with an electric energy storage device or supply power to a device to be powered.

According to the embodiment of the present disclosure, the thermal energy recovery mechanism comprises a thermoelectric generator, and the thermoelectric generator is configured to provide a voltage.

According to the embodiment of the present disclosure, a low temperature side of the thermoelectric generator is provided with a cooling source.

According to the embodiment of the present disclosure, the thermoelectric generator is provided with an electric energy output end, and the electric energy output end of the thermoelectric generator is configured to be connected with an electric energy storage device or supply power to a device to be powered.

According to the embodiment of the present disclosure, the thermoelectric generator has a high temperature side, the high temperature side of the thermoelectric generator is configured to allow the exhaust gas from the exhaust end to pass therethrough, and the high temperature side is arranged in the exhaust pipe.

According to the embodiment of the present disclosure, the thermoelectric generator has a low temperature side, and the thermoelectric generator is configured to provide a voltage in a case where a temperature difference is formed between the high temperature side and the low temperature side, the low temperature side is arranged outside the exhaust pipe, the low temperature side of the thermoelectric generator is provided with a cooling source.

According to the embodiment of the present disclosure, the thermal energy recovery mechanism comprises a thermoelectric generator, the thermoelectric generator has a high temperature side and a low temperature side, and the thermoelectric generator is configured to provide a voltage in a case where a temperature difference is formed between the high temperature side and the low temperature side, and the kinetic energy recovery mechanism comprises a wind power generation device, the wind power generation device comprises a blade, a rotating shaft, and a wind power generator, the blade is connected with the rotating shaft, and the rotating shaft is connected with the wind power generator.

According to the embodiment of the present disclosure, the thermoelectric generator is provided with an electric energy output end, and the electric energy output end of the thermoelectric generator is configured to be connected with an electric energy storage device or supply power to a device to be powered; the wind power generator is provided with an electric energy output end, and the electric energy output end is configured to be connected with an electric energy storage device or supply power to a device to be powered.

According to the embodiment of the present disclosure, the thermal energy recovery mechanism comprises a thermoelectric generator, and the kinetic energy recovery mechanism comprises a wind power generation device.

BRIEF DESCRIPTION OF THE DRAWINGS

In order to explain the technical solution in the embodiments of the present disclosure, the drawings of the embodiments are briefly introduced in the following. The drawings described in the following are only examples of the present disclosure do not constitute any limitation to the scope of the present disclosure.

DETAILED DESCRIPTION

For clearer understanding of the objectives, technical details and advantages of the embodiments of the present disclosure, the technical solutions of the embodiments are described below in connection with the drawings related to the embodiments of the present disclosure. Apparently, the described embodiments are just examples but not all of the embodiments within the protective scope of the present disclosure. Based on the described embodiments herein, those having ordinary skill in the art can obtain and derive other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise", "comprising", "include", "including", etc., are intended to specify that the elements or the objects stated before these terms encompass the elements or the objects and equivalents thereof listed after these terms, but do not preclude the other elements or objects. The phrases "connect", "connected" and the like are not limited to a physical or mechanical connection, but also include an electrical connection, either directly or indirectly. "On," "under," "right," "left" and the like are only used to indicate relative position relationship, and when the position of the described object is changed, the relative position relationship may be changed accordingly.

Turbine fracturing equipment used in oil field well site includes turbine engine. The working principle of the turbine engine is to use the gas discharged from the engine as power to drive the turbine to rotate, and then drive the coaxial impeller to work. After the gas drives the turbine to rotate, it is discharged as exhaust gas through an exhaust pipe, and the temperature of the discharged exhaust gas is up to 1140 F and the air flow reaches 29.8 lbs/sec. The exhaust gas is directly discharged into the atmosphere, resulting in wasting the thermal energy of the exhaust gas (the thermal energy brought by the heat in the exhaust gas) and the kinetic energy of the exhaust gas (the kinetic energy brought by the speed of the air flow in the exhaust gas).

The embodiments of the present application provide turbine fracturing equipment which can realize the reuse of high-temperature exhaust gas discharged by the turbine engine.

Figure 1:
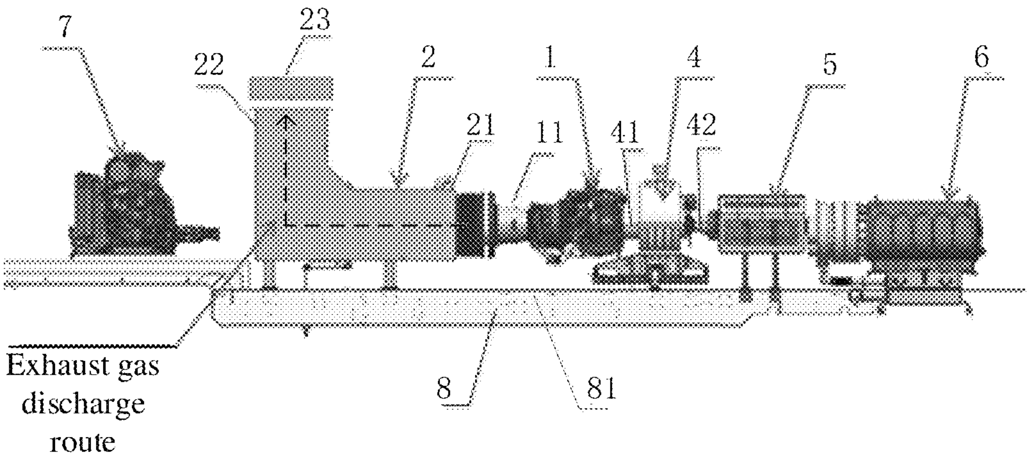
FIG. 1 illustrates a schematic diagram of an example turbine fracturing equipment provided by an embodiment of the present disclosure.
Figure 2:
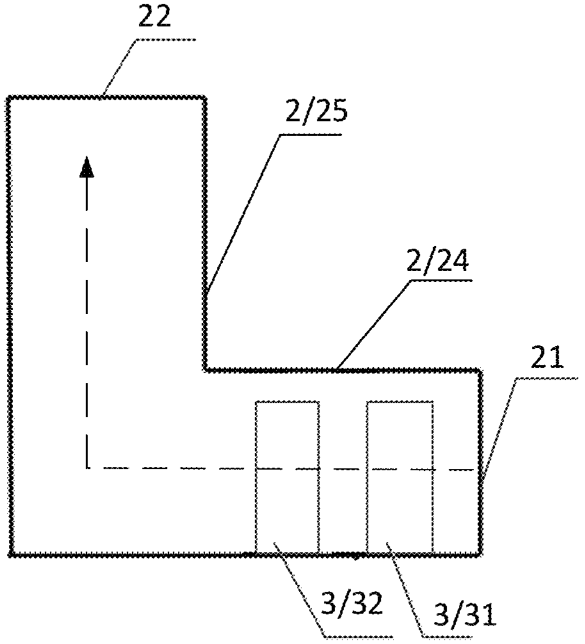
FIG. 2 illustrates a side view of an example exhaust pipe of turbine fracturing equipment provided by an embodiment of the present disclosure.
Figure 3:
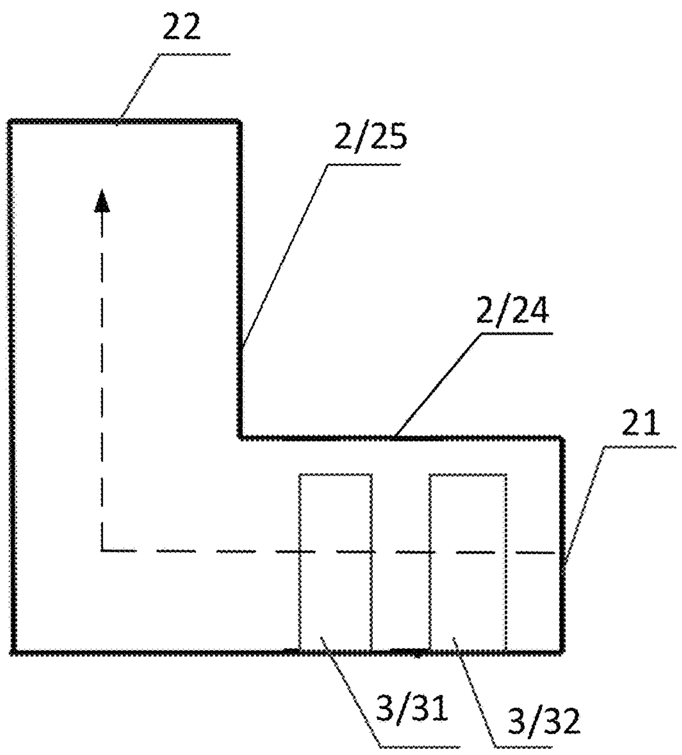
FIG. 3 illustrates a side view of an example exhaust pipe of turbine fracturing equipment provided by another embodiment of the present disclosure.

FIG. 1 illustrates a schematic diagram of turbine fracturing equipment provided by an embodiment of the present disclose. FIG. 2 illustrates a side view of an exhaust pipe of turbine fracturing equipment provided by an embodiment of the present disclose. FIG. 3 illustrates a side view of an exhaust pipe of turbine fracturing equipment provided by another embodiment of the present disclose.

Figure 6:
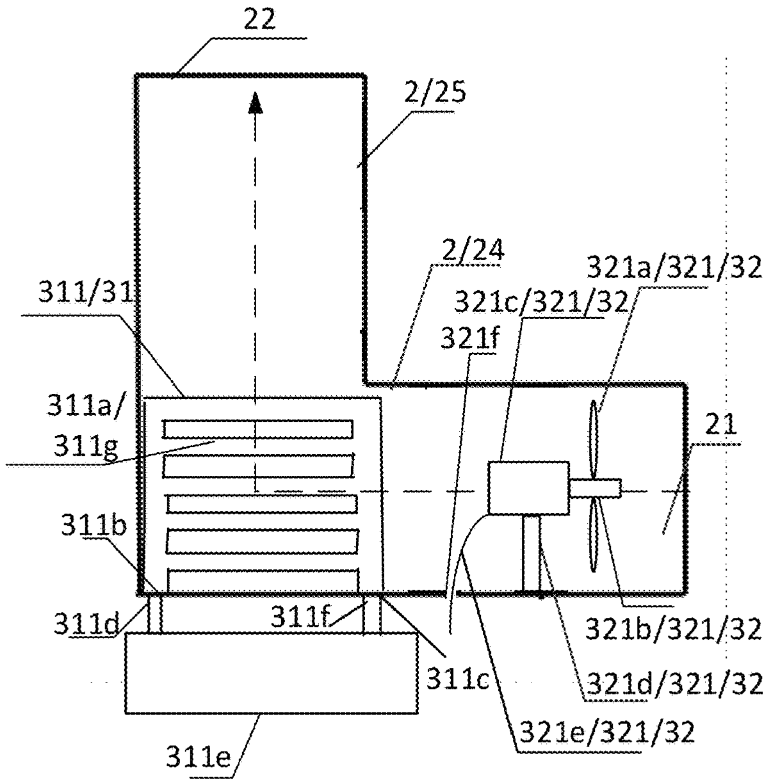
FIG. 6 illustrates a schematic diagram of an example thermal energy recovery mechanism and an example kinetic energy recovery mechanism arranged in an exhaust pipe of turbine fracturing equipment provided by an embodiment of the present disclosure.
Figure 7:
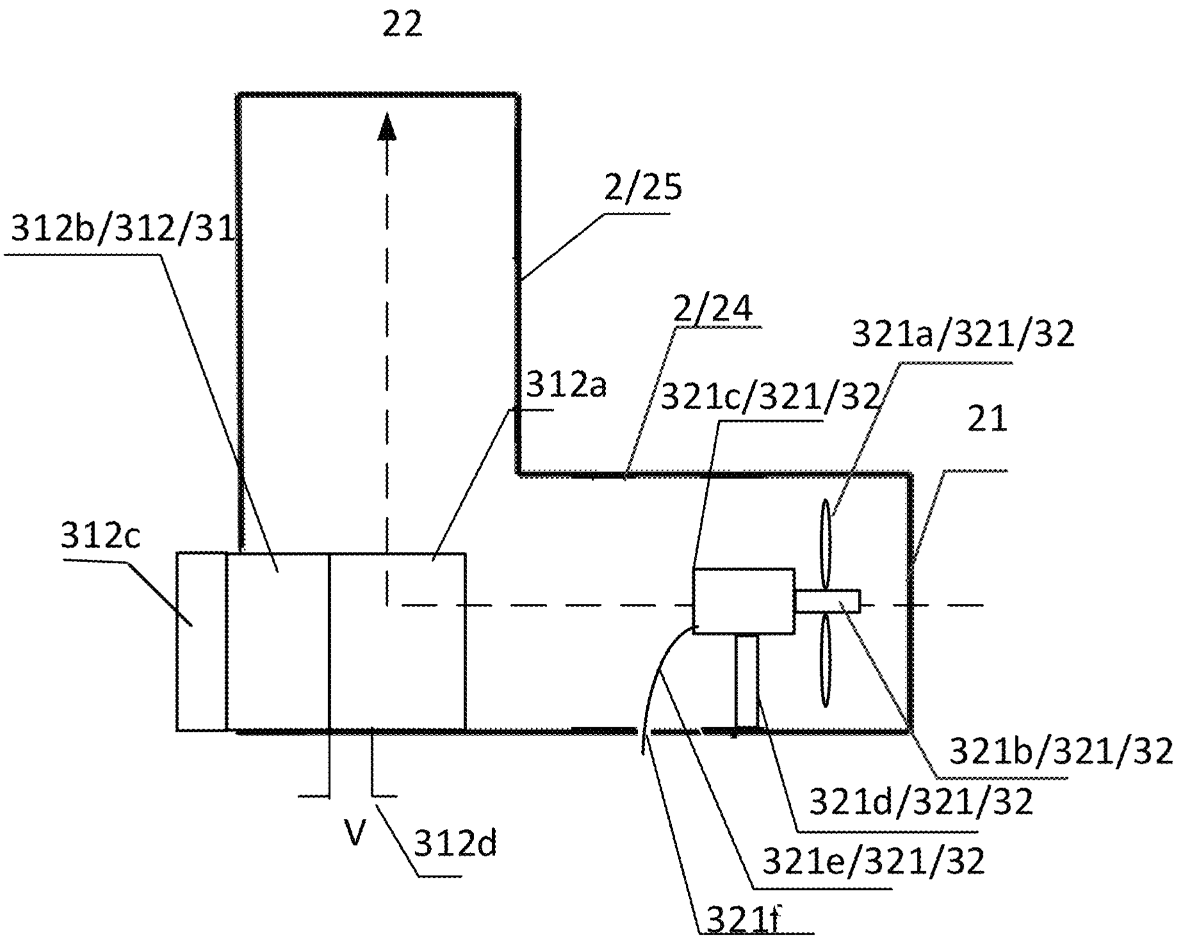
FIG. 7 illustrates a schematic diagram of an example thermal energy recovery mechanism and an example kinetic energy recovery mechanism arranged in an exhaust pipe of turbine fracturing equipment provided by another embodiment of the present disclosure.

As illustrated in FIG. 1, the turbine fracturing equipment of the present disclosure includes: a turbine engine 1, an exhaust pipe 2, and an exhaust gas energy recovery device 3; the turbine engine 1 has an exhaust end 11, and the exhaust end 11 is configured to discharge an exhaust gas; the exhaust pipe 2 has a first end 21 and a second end 22, the first end 21 of the exhaust pipe 2 is configured such that the exhaust gas discharged from the exhaust end 11 of the turbine engine 1 enters the exhaust pipe 2, and the second end 22 of the exhaust pipe 2 is configured to discharge the exhaust gas in the exhaust pipe 2, the exhaust end 11 is in communication with the first end 21 and is hermetically connected with the first end 21; the exhaust gas energy recovery device 3 (as illustrated in FIG. 2 and FIG. 3) includes a thermal energy recovery mechanism 31 and a kinetic energy recovery mechanism 32, and the thermal energy recovery mechanism 31 is configured to recover the thermal energy of the exhaust gas, the kinetic energy recovery mechanism 32 is configured to recover the kinetic energy of the exhaust gas, and at least a part of the thermal energy recovery mechanism 31 and at least a part of the kinetic energy recovery mechanism 32 are arranged in the exhaust pipe 2. As illustrated in FIG. 6, the thermal energy recovery mechanism 31 is integrally arranged in the exhaust pipe 2. As illustrated in FIG. 7, a part of the thermal energy recovery mechanism 31 is arranged in the exhaust pipe 2, and the other part of the thermal energy recovery mechanism 31 is arranged outside the exhaust pipe 2.

As illustrated in FIG. 1, FIG. 2 and FIG. 3, the exhaust gas discharged from the exhaust end 11 of the turbine engine 1 enters the exhaust pipe 2 from the first end 21 of the exhaust pipe 2, then flows through the exhaust gas energy recovery mechanism 3 in the exhaust pipe 2, and finally is discharged from the second end 22 of the exhaust pipe 2 to the outside of the exhaust pipe 2, for example, into the atmosphere. The dotted lines in FIG. 1, FIG. 2, and FIG. 3 illustrate the exhaust route of the exhaust gas in the exhaust pipe 2.

In the turbine fracturing equipment provided by the present disclosure, during the operation of the turbine engine 1, the energy of the exhaust gas discharged by the turbine engine 1 is recovered by the exhaust gas energy recovery device 3 arranged in the exhaust pipe 2. The energy recovery can be well realized by providing the exhaust gas energy recovery device 3 in the exhaust pipe 2.

For example, as illustrated in FIG. 2 and FIG. 3, the thermal energy of the exhaust gas can be recovered by the thermal energy recovery mechanism 31 (for example, a heat exchanger) of the exhaust gas energy recovery device 3, for example, to heat the device to be heated or to convert the thermal energy into electrical energy for storage or for use for the device to be powered. For example, as illustrated in FIG. 2 and FIG. 3, thermal energy recovery mechanism 31 can be connected with the device to be heated (not illustrated in FIG. 2 and FIG. 3) via pipeline to heat the device to be heated. The kinetic energy of the exhaust gas can be recovered by the kinetic energy recovery mechanism 32 of the exhaust gas energy recovery device 3, for example, to convert the kinetic energy into electrical energy for storage or for use for the device to be powered (not illustrated in the figure). In the turbine fracturing equipment provided by the embodiment of the present disclosure, by providing the thermal energy recovery device 31 and the kinetic energy recovery device 32, the thermal energy and kinetic energy of the exhaust gas can be effectively recovered and the energy recovery rate can be improved.

In some embodiments, as illustrated in FIG. 1, the turbine fracturing equipment further includes a reduction gearbox 4, a transmission device 5, and a plunger pump 6. The turbine engine 1 has an output end (not illustrated in the figure), the reduction gearbox 4 has an input end 41 and an output end 42, and the output end of the turbine engine 1 is connected with the input end 41 of the reduction gearbox 4. The output end 42 of the reduction gearbox 4 is connected with the plunger pump 6 through transmission device 5.

According to the turbine fracturing equipment provided by the embodiments of the present disclosure, the turbine engine 1 generates high-temperature gas by burning fuel (for example, natural gas or diesel), the high-temperature gas drives the turbine of the turbine engine 1 to rotate, and the output shaft of the turbine engine connected with the turbine rotates with the turbine in a high-speed. The output shaft of the turbine engine 1 transmits rotation power to the input shaft of the plunger pump 6 through the reduction gearbox 4 and the transmission device 5 to make the plunger pump 6 work. The gas that drives the turbine of the turbine engine 1 to rotate is discharged from the exhaust pipe 2 as exhaust gas, and the thermal energy of the exhaust gas is recovered by the exhaust gas energy recovery device 3 in the exhaust pipe 2 to realize energy recovery.

In some embodiments, as illustrated in FIG. 1, the turbine fracturing equipment may further includes a movable component 8, and the movable component 8 has a first surface 81, on which the turbine engine 1, the exhaust pipe 2, the reduction gearbox 4, the transmission device 5, and the plunger pump 6 are arranged.

In some embodiments, as illustrated in FIG. 1, the movable component 8 may be a skid or a transport vehicle.

According to the embodiments of the present disclosure, the transportation of the turbine fracturing equipment of the present disclosure can be realized in the case where the movable component is a skid or a transport vehicle.

In some embodiments, in order to better realize kinetic energy recovery, referring to FIG. 1 and FIG. 3, the thermal energy recovery mechanism 31 is arranged at a side of the kinetic energy recovery mechanism 32 away from the exhaust end 11. That is, the kinetic energy recovery mechanism 32 is closer to the exhaust end 11 than the thermal energy recovery mechanism 31.

In some embodiments, in order to better realize the thermal energy recovery, referring to FIG. 1 and FIG. 2, the kinetic energy recovery mechanism 32 is arranged at a side of the thermal energy recovery mechanism 31 away from the exhaust end 11. That is, the thermal energy recovery mechanism 31 is closer to the exhaust end 11 than the kinetic energy recovery mechanism 32.

According to the embodiments of the present disclosure, on the basis of the actual working condition of the turbine engine, the thermal energy recovery mechanism 31 can be arranged at a side of the kinetic energy recovery mechanism 32 away from the exhaust end 11, or the kinetic energy recovery mechanism 32 can be arranged at a side of the thermal energy recovery mechanism 31 away from the exhaust end 11. For example, in the case where the temperature of the exhaust gas discharged from the turbine engine 1 is high, the thermal energy recovery mechanism 31 can be arranged at a side of the kinetic energy recovery mechanism 32 away from the exhaust end 11. In the case where the speed of the exhaust gas discharged from the turbine engine 1 is high, the kinetic energy recovery mechanism 32 can be arranged at a side of the thermal energy recovery mechanism 31 away from the exhaust end 11. In this way, the thermal energy and the kinetic energy of the exhaust gas discharged by the turbine engine 1 are fully utilized.

In some embodiments, as illustrated in FIG. 1, FIG. 2 and FIG. 3, the exhaust pipe 2 is L-shaped and includes a first portion 24 and a second portion 25. The first portion 24 extends in a direction parallel with the first surface 81 and the second portion 25 extends in a direction perpendicular to the first surface 81. In the case where the second portion 25 of the exhaust pipe 2 is perpendicular to the first surface 81, the exhaust gas discharged by the turbine engine can be discharged upward, so that it will not affect other equipment in the same horizontal position. The second portion 25 of the exhaust pipe may not be perpendicular to the first surface 81, but at another angle with the first surface 81 (not illustrated in the figure).

In some embodiments, the exhaust pipe 2 may also include only the first portion 24 parallel with the first surface 81 and not include the second portion 25 (this situation is not illustrated in the figure).

In some embodiments, as illustrated in FIG. 2 and FIG. 3, the thermal energy recovery mechanism 31 and kinetic energy recovery mechanism 32 may both be arranged in the first portion 24 of the exhaust pipe 2.

In some embodiments, the thermal energy recovery mechanism 31 may be arranged in the first portion 24, and the kinetic energy recovery mechanism 32 may be arranged in the second portion 25 (not illustrated in the figure).

In some embodiments, as illustrated in FIG. 6 and FIG. 7, the kinetic energy recovery mechanism 32 can be arranged in the first portion 24, and the thermal energy recovery mechanism 31 of the present disclosure can be arranged in the second portion 25.

Figure 4:
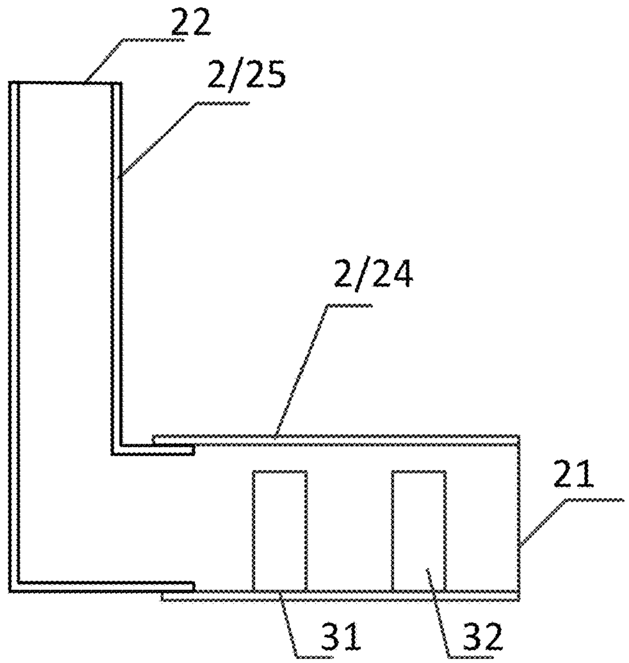
FIG. 4 illustrates a side view of an example exhaust pipe of turbine fracturing equipment provided by an embodiment of the present disclosure.
Figure 5:
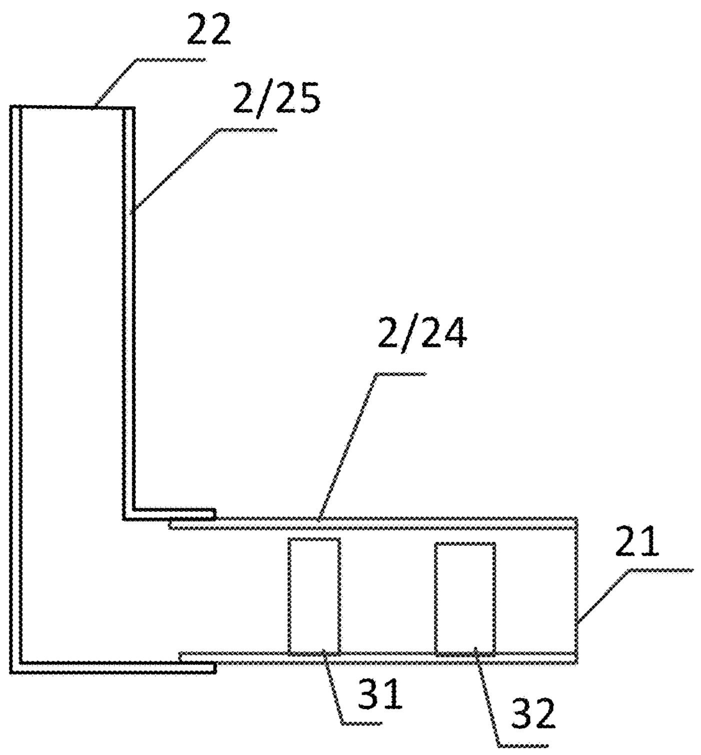
FIG. 5 illustrates a side view of an example exhaust pipe of turbine fracturing equipment provided by an embodiment of the present disclosure.

FIG. 4 illustrates a side view of an exhaust pipe of turbine fracturing equipment provided by an embodiment of the present disclose. FIG. 5 illustrates a side view of an exhaust pipe of turbine fracturing equipment provided by an embodiment of the present disclose.

As illustrated in FIG. 4, the second portion 25 of the exhaust pipe 2 may be sleeved in the first portion 24 of the exhaust pipe. For example, as illustrated in FIG. 4, the thermal energy recovery mechanism 31 and the kinetic energy recovery mechanism 32 can be placed in the first portion 24 firstly, and then the second portion 25 can be sleeved in the first portion 24. For example, firstly, the kinetic energy recovery mechanism 32 and the thermal energy recovery mechanism 31 can be placed in the first portion 24 and in the portion 25, respectively, and then the second portion 25 can be sleeved in the first portion 24.

As illustrated in FIG. 5, the first portion 24 of the exhaust pipe can be sleeved in the second portion 25 of the exhaust pipe. For example, as illustrated in FIG. 5, the thermal energy recovery mechanism 31 and the kinetic energy recovery mechanism 32 can be placed in the first portion 24, and then the first portion 24 can be sleeved in the second portion 25. For example, the kinetic energy recovery mechanism 32 and the thermal energy recovery mechanism 31 can be arranged in the first portion 24 and the second portion 25, respectively, and then the first portion 24 can be sleeved in the second portion 25.

FIG. 6 illustrates a schematic diagram of a thermal energy recovery mechanism and a kinetic energy recovery mechanism that are arranged in an exhaust pipe of turbine fracturing equipment provided by an embodiment of the present disclose.

In some embodiments, as illustrated in FIG. 6, the thermal energy recovery mechanism 31 includes a heat exchanger 311, which can be integrally arranged in the exhaust pipe 2. The heat exchanger 311 has a heat exchange assembly 311*a*. A working medium is provided within the heat exchange assembly 311*a*. The exhaust pipe 2 is provided with a working medium inlet 311*b* and a working medium outlet 311*c*. The working medium may include, for example, water. The working medium can also be other fluids, as long as it can exchange heat with the exhaust gas. A first pipeline 311*d* and a second pipeline 311*f* are disposed on the working medium inlet 311*b* and the working medium outlet 311*c*, respectively. The first pipeline 311*d* and the second pipeline 311*f* are arranged outside the exhaust pipe 2, and the first pipeline 311*d* and the second pipeline 311*f* are connected with the heat storage device 311*e*, respectively. For example, the working medium inlet 311*b* and the working medium outlet 311*c* may be arranged at the bottom of the exhaust pipe 2, and the heat storage device 311*e* may be arranged between the bottom of the exhaust pipe 2 and the movable component 8 illustrated in FIG. 1 (e.g., skid or transport vehicle), to be placed on the first surface 81 of the movable component 8. The heat exchange assembly 311*a* receives the working medium from the outside of the exhaust pipe 2 through the working medium inlet 311*b*, and outputs the working medium to the outside through the working medium outlet 311*c*. A power component (not illustrated), such as a pump, may be provided in the first pipeline 311*d* between the working medium inlet 311*b* and the heat storage device 311*e*. In this way, the working medium in the heat exchange assembly 311*a* enters the heat storage device 311*e* from the working medium outlet 311*c* and through the second pipeline 311*f*, and under the action of the pump, then returns to the heat exchange assembly 311*a* from the heat storage device 311*e* through the first pipeline 311*d* and the working medium inlet 311*b*. The exhaust gas from the exhaust end 21 flows through the heat exchange assembly 311*a* of the heat exchanger 311, so that the heat of the exhaust gas is transferred to the working medium in the heat exchanger 311, and the heat is stored in the heat storage device 311*e* when the working medium flows through the heat storage device 311*e*. For example, the heat storage device 311*e* is placed close to the device to be heated (not illustrated), for example, in contact with the device to be heated to transfer its heat to the device to be heated.

In this way, according to the turbine fracturing equipment provided by the embodiment of the present disclosure, the exhaust gas from the exhaust end 11 passes through the heat exchange assembly 311*a* of the heat exchanger 311, transfers its heat to the working medium in the heat exchange assembly 311*a*, and the working medium absorbs the heat of the exhaust gas flows into the heat storage device 311*e* through the second pipeline 311*f*, and then under the action of the pump, flows back into the heat exchanger 311 from the heat storage device 311*e* through the first pipeline 311*d*. For example, the heat storage device 311*e* is placed close to the device to be heated to heat the device to be heated. The device to be heated can be, for example, a lubricating oil tank, a hydraulic oil tank, a liquified natural gas storage device, a fuel oil system, or other devices in an oil field well site of turbine fracturing equipment.

In some embodiments, as illustrated in FIG. 6, the heat exchange assembly 311*a* may include a plurality of heat exchange subassemblies 311*g*. The plurality of heat exchange subassembly 311*g* are connected with each other so that the working medium can flow between heat exchange subassemblies 311*g* to facilitate heat exchange with the exhaust gas. The heat exchange subassembly 311*g* may be arranged in the exhaust pipe 2 along the extension direction of the first portion 24, as illustrated in FIG. 6. The heat exchange subassembly 311*g* may also be arranged in other ways, for example, arranged along the extension direction of the second portion 25, as long as it can fully exchange heat with the exhaust gas. The heat exchange subassembly 311*g* may be tubular or plate-shaped, or other shapes conducive to sufficient heat exchange with the exhaust gas.

In this way, according to the turbine fracturing equipment provided by the embodiments of the present disclosure, the thermal energy of the exhaust gas discharged from the turbine engine can be used to heat the device to be heated in the turbine fracturing equipment or other devices in the oil field well site through the thermal energy recovery mechanism, to save energy.

In some embodiments, as illustrated in FIG. 7, the thermal energy recovery mechanism 31 includes a thermoelectric generator 312 which has a high temperature side 312*a* and a low temperature side 312*b*, and the thermoelectric generator 312 is configured to provide a voltage V in the case where a temperature difference is formed between the high temperature side 312*a* and the low temperature side 312*b*, and to output the voltage V via the voltage output end 312*d* of the thermoelectric generator 312.

In some embodiments, referring to FIG. 1 and FIG. 7, the high temperature side 312*a* of the thermoelectric generator 312 is arranged in the exhaust pipe to allow the exhaust gas from the exhaust end 11 to pass through the high temperature side 312*a* of the thermoelectric generator 312, and the low temperature side 312*b* is arranged outside the exhaust pipe to ensure that the heat of the exhaust gas is sufficiently absorbed by the high temperature side 312*a* of the thermoelectric generator and to keep the temperature of the high temperature side higher than the temperature of the low temperature side 312*b*, so that a certain temperature difference is formed between the high temperature side and the low temperature side to generate a voltage. According to the embodiments of the present disclosure, the larger the area of the high temperature side of the thermoelectric generator where the exhaust gas passes through, the more the thermal energy of the exhaust gas can be utilized by the thermoelectric generator, so that more electric energy can be generated.

Figure 8:
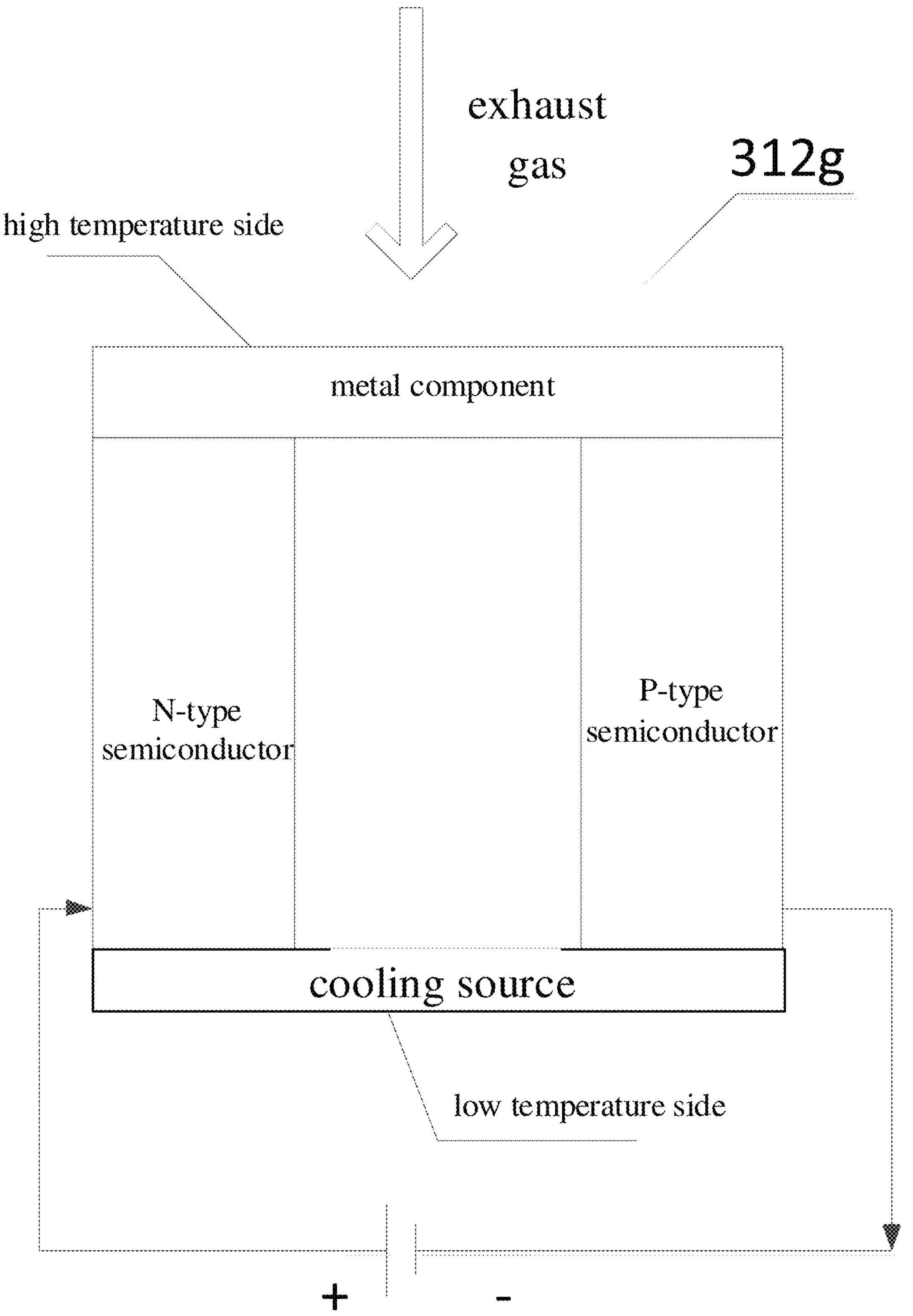
FIG. 8 illustrates a schematic diagram of an example thermoelectric generator of turbine fracturing equipment provided by an embodiment of the present disclosure.

In some embodiments, as illustrated in FIG. 7 and FIG. 8, the low temperature side 312*b* of the thermoelectric generator 312 may be provided with a cooling source 312*c*, which may include a coolant, such as water. In this way, a larger temperature difference between the high temperature side 312*a* and the low temperature side 312*b* is maintained and the temperature difference is more stable, so that a more stable voltage is output from the voltage output end 312*d*. The voltage output end 312*d* may protrude from the exhaust pipe 2 through, for example, a hole (not illustrated) provided in the bottom of the exhaust pipe 2. The voltage output end 312*d* may be connected with a first electric energy storage device (not illustrated in the figure) disposed outside the exhaust pipe 2 and disposed on the first surface 81 illustrated in FIG. 1, so as to store the electric energy output by the thermoelectric generator 312 in the first electric energy storage device. The electrical energy output by the voltage output end 312*d* can be supplied to, for example, a control system, a lighting system, a power supply system or other devices of the oil field well site.

In some embodiments, as illustrated in FIG. 8, the thermoelectric generator 312 may include at least one semiconductor power generation element 312*g*, which includes p-type semiconductor, n-type semiconductor, and a metal component. As illustrated in FIG. 8, the semiconductor power generation element 3121 is provided with a high temperature side and a low temperature side, which can make the semiconductor power generation element 312*g* generate voltage, so as to convert the thermal energy of the exhaust gas into electric energy. More electric energy can be obtained by connecting a plurality of the above-mentioned semiconductor power generating elements 312*g* in parallel.

In this way, according to the embodiments of the present disclosure, the thermal energy recovery mechanism can utilize the thermal energy of the exhaust gas discharged from the turbine engine to supply power to the device to be powered in the oil field well site to save energy.

In some embodiments, as illustrated in FIG. 6 and FIG. 7, the thermal energy recovery mechanism 31 in the turbine fracturing equipment provided by an embodiment of the present disclosure may include only heat exchanger 311 or only thermoelectric generator 312, or include both of the heat exchanger 311 and the thermoelectric generator 312 (the case including both is not illustrated in the figure), so as to make full use of the thermal energy of the exhaust gas discharged by the turbine generator.

In some embodiments, as illustrated in FIG. 6 and FIG. 7, the kinetic energy recovery mechanism 32 includes a wind power generation device 321, which includes a blade 321*a*, a rotating shaft 321*b*, and a wind power generator 321*c*, the blade 321*a* is connected with the rotating shaft 321*b*, the rotating shaft 321*b* is connected with the wind power generator 321*c*, and the wind power generator 321 is provided with an electric energy output end 321*e*, the electric energy output end 321*e* is configured to be connected with a second electric energy storage device (not illustrated in the figure) arranged outside the exhaust pipe 2, and the second electric energy storage device can be arranged on the first surface illustrated in FIG. 1. The second electric energy storage device and the first electric energy storage device can be the same device, or different devices. For example, in the case where the cross section of the exhaust pipe 2 is circular, the ratio of the length of the blade 321*a* along the cross section of the exhaust pipe to the radius of the circle ranges from ½ to ¾. Within this ratio range, it is conducive to both the rotation of the blades for power generation and the discharge of exhaust gas from the exhaust pipe 2. The wind power generator support 321*d* is arranged on the inner surface of the exhaust pipe 2, and the wind power generator 321*c* is arranged on the wind power generator support 321*d* to be fixed in the exhaust pipe 2. The electric energy storage device may be, for example, a high-capacity battery or a lithium battery. For example, the electric energy output end 321*e* may include an electric wire, which extends from the exhaust pipe 2 through a through hole 321*f* arranged in the bottom of the exhaust pipe 2 so as to be connected with an electric energy storage device (not illustrated in the figure) arranged outside the exhaust pipe 2 and arranged on the first surface 81 illustrated in FIG. 1 to store the electric energy generated by the wind power generation device 321. The electric wire can also be connected with the control system, lighting system, power supply system or other devices in the oil field well site to supply power thereto. As illustrated in FIG. 6 and FIG. 7, a part of the electric energy output end 321*e* of the electric wire of the wind power generation device 321 may be arranged outside the exhaust pipe 2, and the other parts of the wind power generation device 321 may be arranged in the exhaust pipe 2.

According to the embodiments of the present disclosure, the blade 321*a* of the wind power generation device 321 of the kinetic energy recovery mechanism 32 rotates at a high speed driven by the high-speed exhaust gas discharged from the exhaust end 11, thereby driving the rotating shaft 321*b* to rotate, so as to make the wind power generator 321*c* generates electric energy and the electric energy is output from the electric energy output end 321*e*. The electric energy output from the electric energy output end 321*e* can supply power to the control system, lighting system, power supply system or other devices in the oil field well site, or can be stored in the second electric energy storage device.

In this way, according to the embodiments of the present disclosure, through the kinetic energy recovery mechanism in the turbine fracturing equipment provided by an embodiment of the present disclosure, the high-speed exhaust gas discharged by the turbine engine can be used to supply power the devices to be powered in the oil field well site, so as to save energy.

According to some embodiments of the present disclosure, as illustrated in FIG. 5, in the case where the thermal energy recovery mechanism 31 includes a thermoelectric generator 312 and the kinetic energy recovery mechanism 32 includes a wind power generation device 321, the thermal energy and kinetic energy can be recovered for power generation.

In some embodiments, as illustrated in FIG. 5, in order to better recover kinetic energy, the thermal energy recovery mechanism 31 may be arranged at a side of the kinetic energy recovery mechanism 32 away from the exhaust end 21. For example, in the case where the kinetic energy recovery mechanism 32 is a wind power generation device 321 and the thermal energy recovery mechanism 31 is a thermoelectric generator 312, the thermoelectric generator 312 is arranged at a side of the wind power generation device 321 away from the exhaust end 21. In this case, the exhaust gas discharged from the exhaust end 21 firstly passes through the wind power generation device 312 to drive the blades of the wind power generation device for power generation, and then the exhaust gas passes through the thermoelectric generator 312 to generate a temperature difference between the high temperature side and the low temperature side of the thermoelectric generator for power generation.

In some embodiments, the kinetic energy recovery mechanism 32 may be arranged at a side of the thermal energy recovery mechanism 31 away from the exhaust end 21. For example, in the case where the kinetic energy recovery mechanism 32 is a wind power generation device 321 and the thermal energy recovery mechanism 31 is a thermoelectric generator 312, the wind power generation device 321 is arranged at a side of the thermoelectric generator 312 away from the exhaust end 21 (not illustrated in the figure). In this case, the exhaust gas discharged from the exhaust end 21 firstly passes through the thermoelectric generator 312 to generate a temperature difference between the high temperature side and the low temperature side of the thermoelectric generator for power generation, and then the exhaust gas passes through the wind power generation device 312 to drive the blades of the wind power generation device for power generation.

The electric energy generated by the wind power generation device and the thermoelectric generator can be stored in the electric energy storage device, or used for the device to be powered, or stored in the electric energy storage device and used for the device to be powered, respectively.

According to some embodiments of the present disclosure, in the case where the thermal energy recovery mechanism includes a heat exchanger and the kinetic energy recovery mechanism includes a wind power generation device, the utilization of electric energy and thermal energy can be realized at the same time.

In some embodiments, as illustrated in FIG. 4, the thermal energy recovery mechanism 31 may be arranged at a side of the kinetic energy recovery mechanism 32 away from the exhaust end 21. That is, the heat exchanger 311 is arranged at a side of the wind power generation device 321 away from the exhaust end 21. In this case, the exhaust gas discharged from the exhaust end 21 firstly passes through the wind power generation device 312 to drive the blades of the wind power generation device for power generation, and then the exhaust gas passes through the heat exchanger 211 for heat exchange, so as to store the thermal energy in the heat storage device.

In some embodiments, the kinetic energy recovery mechanism 32 may be arranged at a side of the thermal energy recovery mechanism 31 away from the exhaust end 21. That is, the wind power generation device 321 is arranged at a side of the heat exchanger 311 away from the exhaust end 21 (not illustrated in the figure). In this case, the exhaust gas discharged from the exhaust end 21 firstly passes through the heat exchanger 311 for heat exchange, so as to store the thermal energy in the heat storage device, and then the exhaust gas passes through the wind power generation device 312 to drive the blades of the wind power generation device for power generation.

In the above case, the electric energy generated by the wind power generation device can be used to supply power to the device to be powered or can be stored in the electric energy storage device, and the thermal energy transmitted by the heat exchanger can be stored in the heat storage device to heat the device to be heated.

In some embodiments, as illustrated in FIG. 1, the turbine fracturing equipment provided by an embodiment of the present disclosure may further include a starting device 7. For example, the starting device 7 may be a diesel engine, a gas turbine or an electric motor. The starting device 7 is configured to start the turbine engine 1 and the lubricating oil tank (not illustrated) of the turbine fracturing equipment. The lubricating oil tank provides lubrication for turbine engine, reduction gearbox, plunger pump, etc.

In some embodiments, as illustrated in FIG. 1, the second end 22 of the exhaust pipe 2 may be provided with a rain cap 23, which is hinged to the second end 22 of the exhaust pipe 2. The second end 22 of the exhaust pipe 2 is in a form of being opened. If the rain cap 23 is not provided, rain water will fall into the exhaust pipe 2 when it rains, and rain water may pour into the turbine engine 1, thus damaging the turbine engine 1, and this case can be avoided by providing the rain cap 23. The rain cap 23 can be completely closed when it is not working or it is raining. The rain cap 23 can be opened in working condition.

According to the turbine fracturing equipment provided by the embodiments of the present disclosure, by providing the thermal energy recovery mechanism and the kinetic energy recovery mechanism in the exhaust pipe, the high-temperature and high-speed exhaust gas discharged by the turbine engine of the turbine fracturing equipment can be recovered and utilized. The thermal energy recovery mechanism can use the thermal energy of the exhaust gas to heat the device to be heated installed in the oil field well site, or convert the thermal energy of the exhaust gas into electrical energy to be stored in an electric energy storage device or used to supply power to the device to be powered in the oil field well site. The kinetic energy recovery mechanism can convert the kinetic energy of exhaust gas into electrical energy for storage in an electrical energy storage device or used to supply power to the device to be powered in the oil field well site. Therefore, the turbine fracturing equipment provided by the embodiments of the present disclosure can realize the full reuse of the energy of the exhaust gas, so as to save energy.

What is claimed is:

1. A turbine fracturing equipment, comprising:

a turbine engine comprising an exhaust end configured to discharge an exhaust gas;

an exhaust pipe comprising a first end and a second end, the first end of the exhaust pipe being configured such that the exhaust gas discharged from the exhaust end of the turbine engine enters the exhaust pipe via the first end, and the second end of the exhaust pipe being configured to discharge the exhaust gas in the exhaust pipe; and an exhaust gas energy recovery device comprising a thermal energy recovery mechanism and a kinetic energy recovery mechanism, the thermal energy recovery mechanism being configured to recover thermal energy of the exhaust gas, and the kinetic energy recovery mechanism being configured to recover kinetic energy of a flow of the exhaust gas via wind power generation, wherein at least a part of the thermal energy recovery mechanism and at least a part of the kinetic energy recovery mechanism are arranged in the exhaust pipe, wherein the kinetic energy recovery mechanism comprises a wind power generation device with fan blades coupled to a rotating shaft, connected to a wind power electric generator, the fan blades covering ¼ to 9/16 of a cross-section of the exhaust pipe when rotating.

2. The turbine fracturing equipment according to claim 1, further comprising a reduction gearbox, a transmission device, and a plunger pump, wherein:

the turbine engine comprises an output end;

the reduction gearbox comprises an input end and an output end;

the output end of the turbine engine is connected with the input end of the reduction gearbox; and the output end of the reduction gearbox is connected with the plunger pump through the transmission device.

3. The turbine fracturing equipment according to claim 2, further comprising a movable component, wherein the movable component comprises a first surface, and the turbine engine, the exhaust pipe, the reduction gearbox, the transmission device, and the plunger pump are arranged on the first surface.

4. The turbine fracturing equipment according to claim 3, wherein the movable component comprises a skid or a transport vehicle.

5. The turbine fracturing equipment according to claim 1, wherein the thermal energy recovery mechanism is arranged at a side of the kinetic energy recovery mechanism away from the exhaust end.

6. The turbine fracturing equipment according to claim 1, wherein the kinetic energy recovery mechanism is arranged at a side of the thermal energy recovery mechanism away from the exhaust end.

7. The turbine fracturing equipment according to claim 1, wherein:

the thermal energy recovery mechanism comprises a heat exchanger arranged in the exhaust pipe, a working medium is provided within the heat exchanger;

the heat exchanger comprises a working medium inlet and a working medium outlet;

the heat exchanger is configured to allow the exhaust gas from the exhaust end to flow therethrough; and the working medium inlet and the working medium outlet are communicated with a heat storage device.

8. The turbine fracturing equipment according to claim 1, wherein:

the thermal energy recovery mechanism comprises a thermoelectric generator;

the thermoelectric generator comprises a high temperature side and a low temperature side; and the thermoelectric generator is configured to generate a voltage when a temperature difference is formed between the high temperature side and the low temperature side.

9. The turbine fracturing equipment according to claim 8, wherein:

the high temperature side of the thermoelectric generator is configured to allow the exhaust gas from the exhaust end to pass through the thermoelectric generator; and the high temperature side is arranged in the exhaust pipe and the low temperature side is arranged outside the exhaust pipe.

10. The turbine fracturing equipment according to claim 1, wherein:

the wind power electric generator is provided with an electric energy output end; and the electric energy output end is configured to be connectable with an electric energy storage device.

11. The turbine fracturing equipment according to claim 1, wherein the thermal energy recovery mechanism comprises a thermoelectric generator, and the thermoelectric generator is configured to generate a voltage.

12. The turbine fracturing equipment according to claim 11, wherein a low temperature side of the thermoelectric generator is provided with a cooling source.

13. The turbine fracturing equipment according to claim 11, wherein:

the thermoelectric generator comprises an electric energy output end; and the electric energy output end of the thermoelectric generator is configured to be connectable with an electric energy storage device or to supply power to an electric device.

14. The turbine fracturing equipment according to claim 11, wherein:

the thermoelectric generator comprises a high temperature side;

the high temperature side of the thermoelectric generator is configured to allow the exhaust gas from the exhaust end to pass through the thermoelectric generator; and the high temperature side is arranged in the exhaust pipe.

15. The turbine fracturing equipment according to claim 14, wherein:

the thermoelectric generator comprises a low temperature side;

the thermoelectric generator is configured to generate a voltage when a temperature difference is formed between the high temperature side and the low temperature side;

the low temperature side is arranged outside the exhaust pipe; and the low temperature side of the thermoelectric generator is provided with a cooling source.

16. The turbine fracturing equipment according to claim 1, wherein:

the thermal energy recovery mechanism comprises a thermoelectric generator;

the thermoelectric generator comprises a high temperature side and a low temperature side; and the thermoelectric generator is configured to generate a voltage when a temperature difference is formed between the high temperature side and the low temperature side.

17. The turbine fracturing equipment according to claim 16, wherein:

the thermoelectric generator comprises an electric energy output end;

the electric energy output end of the thermoelectric generator is configured to be connectable with an electric energy storage device or to supply power to an electric device;

the wind power electric generator comprises an electric energy output end; and the electric energy output end of the wind power electric generator is configured to be connectable with the electric energy storage device or to supply power to the electric device.

* * * * *